(12) United States Patent
Afzali-Ardakani et al.

(10) Patent No.: US 6,746,053 B1
(45) Date of Patent: Jun. 8, 2004

(54) SYSTEM FOR PREVENTING PARALLEL MARKETING OF RETAIL ITEMS

(75) Inventors: Ali Afzali-Ardakani, Yorktown Heights, NY (US); Claudius Feger, Croton-on-Hudson, NY (US); Marco Martens, Chappaqua, NY (US); Paul Andrew Moskowitz, Yorktown Heights, NY (US); Alejandro Gabriel Schrott, New York, NY (US); Charles P. Tresser, Mamaroneck, NY (US); Robert Jacob von Gutfeld, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,280

(22) Filed: Oct. 29, 1998

(51) Int. Cl.[7] ............................................. B42D 15/00
(52) U.S. Cl. ..................... 283/72; 283/91; 283/113; 235/435; 235/454; 235/462.01; 235/462.13; 235/491; 428/29; 428/40.2; 428/41.6; 428/64.4; 428/211; 428/913; 427/197; 427/198; 427/256; 705/28; 206/495.5; 340/572.1; 340/5.91; 340/5.86; 340/5.9; 340/568.1; 340/571; 340/572.8; 340/572.9; 340/618; 340/619; 340/620; 340/621
(58) Field of Search ........................... 283/72, 91, 113; 705/28; 235/462.01, 462.13, 435, 491, 454; 427/197, 198, 256; 428/64.4, 29, 211, 41.6, 40.2, 913; 206/459.5

(56) References Cited

U.S. PATENT DOCUMENTS

| | | | | | |
|---|---|---|---|---|---|
| 3,887,742 A | * | 6/1975 | Reinnagel | ................ | 428/211.1 |
| 3,955,295 A | | 5/1976 | Mayer | | |
| 3,959,630 A | * | 5/1976 | Hogberg | ...................... | 235/491 |
| 4,025,673 A | * | 5/1977 | Reinnagel | ..................... | 428/29 |
| 4,238,524 A | | 12/1980 | LaLiberte et al. | | |
| 4,463,970 A | | 8/1984 | Kaule et al. | | |
| 4,501,439 A | * | 2/1985 | Antes | ........................... | 283/91 |
| 4,686,515 A | * | 8/1987 | Anderson et al. | ............. | 340/5.8 |
| 4,710,614 A | * | 12/1987 | Camus | ........................ | 238/380 |
| 4,767,205 A | * | 8/1988 | Schwartz et al. | ............. | 356/71 |
| 5,005,873 A | * | 4/1991 | West | ............................ | 283/92 |
| 5,296,949 A | * | 3/1994 | Pennace | ........................ | 359/2 |
| 5,666,417 A | * | 9/1997 | Liang et al. | .................. | 283/92 |
| 5,673,338 A | * | 9/1997 | Denenberg et al. | ......... | 382/209 |
| 5,706,047 A | * | 1/1998 | Lentz et al. | ................. | 347/262 |
| 5,767,772 A | * | 6/1998 | Lemaire et al. | ............. | 340/571 |
| 5,837,042 A | * | 11/1998 | Lent et al. | ................ | 106/31.14 |
| 5,876,820 A | * | 3/1999 | Koike et al. | ............... | 428/64.1 |
| 5,920,261 A | * | 7/1999 | Hughes et al. | ........... | 340/568.8 |
| 5,928,708 A | * | 7/1999 | Hansmire et al. | ............... | 427/1 |
| 5,971,276 A | * | 10/1999 | Sano et al. | ............ | 236/462.01 |

(List continued on next page.)

FOREIGN PATENT DOCUMENTS

| | | |
|---|---|---|
| GB | 2 101 376 A | 1/1983 |
| GB | 2 289 150 A | 11/1995 |
| GB | 2 312 307 A | 10/1997 |
| WO | WO 84/03019 A1 | 8/1984 |

OTHER PUBLICATIONS

British Search Report dated Dec. 13, 1999.

*Primary Examiner*—Derris H. Banks
*Assistant Examiner*—Mark T. Henderson
(74) *Attorney, Agent, or Firm*—Stephen C. Kaufman, Esq.; McGinn & Gibb, PLLC

(57) ABSTRACT

A system and method for detecting parallel marketing of an item, include forming at least one of a coating and a code on the item, interrogating the at least one of the coating and said code, and determining from the interrogating whether the item has been transferred from an authorized merchant to an unauthorized merchant.

13 Claims, 2 Drawing Sheets

U.S. PATENT DOCUMENTS

| | | | |
|---|---|---|---|
| 5,974,150 A | * | 10/1999 | Kaish et al. ................... 283/85 |
| 5,982,282 A | * | 11/1999 | Ryan, Jr. ................. 340/572.1 |
| 6,075,594 A | * | 6/2000 | Thomas et al. ............. 356/328 |
| 6,123,263 A | * | 9/2000 | Feng .................... 235/462.42 |
| 6,137,413 A | * | 10/2000 | Ryan, Jr. ................. 340/572.8 |
| 6,155,605 A | * | 12/2000 | Bratchley et al. ............. 283/57 |
| 6,200,628 B1 | | 3/2001 | Rozumek et al. |
| 6,226,619 B1 | * | 5/2001 | Halperin et al. ................ 705/1 |
| 6,246,778 B1 | * | 6/2001 | Moore ....................... 382/103 |
| 6,330,939 B1 | * | 12/2001 | Pratt ......................... 194/206 |
| 6,386,671 B1 | * | 5/2002 | Huston et al. ......... 235/462.08 |
| 6,477,134 B1 | * | 11/2002 | Stebbings et al. .......... 369/272 |
| 6,558,768 B2 | * | 5/2003 | Noguchi et al. ........... 428/64.1 |
| 6,589,626 B2 | * | 7/2003 | Selinfreund et al. ....... 428/64.1 |
| 2002/0017560 A1 | * | 2/2002 | Mos et al. ................... 235/435 |
| 2002/0021001 A1 | * | 2/2002 | Stratford et al. ............... 283/74 |
| 2002/0074412 A1 | * | 6/2002 | Stebbings et al. .......... 235/487 |
| 2002/0081382 A1 | * | 8/2002 | Stebbings et al. .......... 427/256 |
| 2002/0130186 A1 | * | 9/2002 | Lasch et al. ................ 235/488 |
| 2002/0143671 A1 | * | 10/2002 | Afzali-Ardakani et al. ... 705/28 |
| 2002/0145049 A1 | * | 10/2002 | Lasch et al. ................ 235/488 |
| 2003/0030558 A1 | * | 2/2003 | Stevenson et al. ....... 340/572.1 |

* cited by examiner

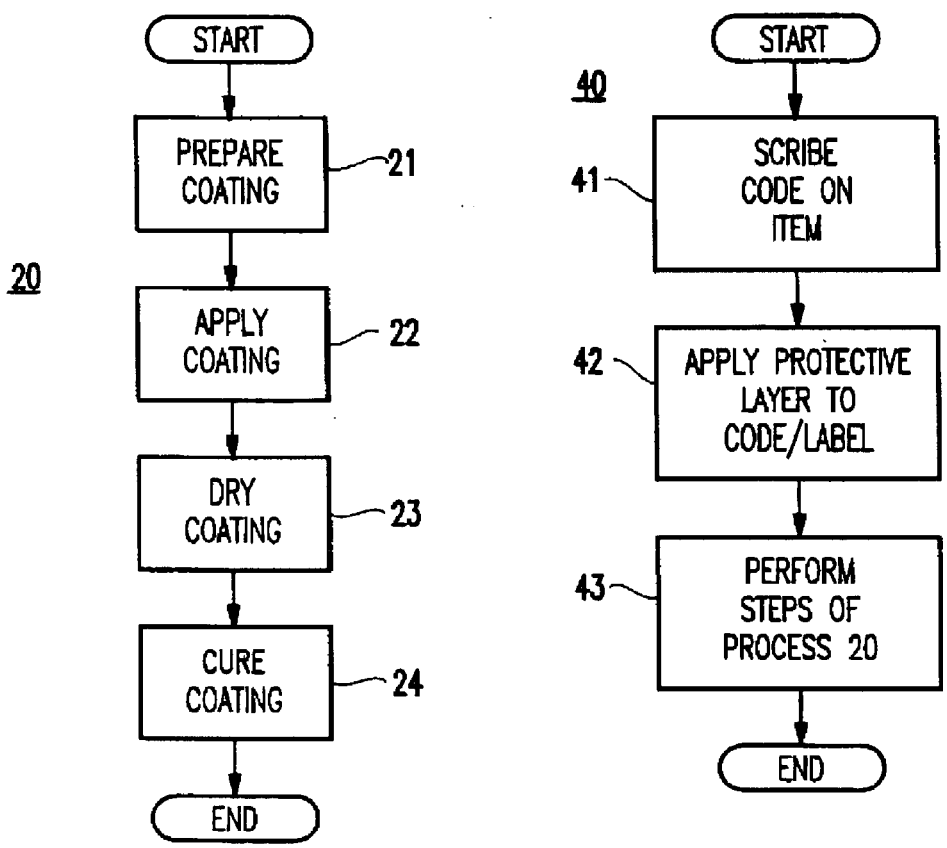

SYSTEM FOR PREVENTING PARALLEL MARKETING OF RETAIL ITEMS

CROSS-REFERENCE TO RELATED APPLICATIONS

The present application is related to U.S. patent application Ser. No. 09/182,269, now U.S. Pat. No. 6,226.619, filed on Oct. 29, 1998. to Arnold Halperin et al., entitled "METHOD AND SYSTEM FOR PREVENTING COUNTERFEITING OF HIGH PRICE WHOLESALE AND RETAIL US" having IBM Docket No. YO998-287, assigned to the present assignee, and incorporated herein by reference, and to U.S. patent application Ser. No. 09/182,279. filed on Oct. 29, 1998, to Don Coppersmith et al., entitled "SYSTEM FOR PROTECTION OF GOODS AGAINST COUNTERFEITING" having IBM Docket No. YO998-313, assigned to the present assignee, and incorporated herein by reference.

BACKGROUND OF THE INVENTION

1. Field of the Invention

The present invention relates to a method and system for preventing parallel marketing of wholesale and retail items, and more particularly to a method and system for detecting the source (e.g., a first merchant) from which a second merchant has received (e.g., directly or indirectly) goods for re-sale, and for subsequently preventing such a transfer of the manufacturer's goods.

2. Description of the Related Art

In commerce, oftentimes, a manufacturer's goods are trans-shipped from a first merchant, which is usually a "legitimate" wholesaler or retailer, to another merchant which is usually not legitimate. The first merchant is "legitimate" in terms of being generally licensed by the manufacturer to sell the manufacturer's goods in a market under terms defined by the manufacturer.

In so-called "parallel marketing", the first merchant (e.g., generally legitimate or licensed) sells the manufactured goods to a second merchant (e.g., generally unlicenced) who can then create a market independent of the manufacturer. This practice makes it possible for the unlicenced merchant to undersell the licensed merchants operating legitimately in the local marketplace. The party typically in violation in this transaction is the first merchant since reselling to a second merchant generally violates the contract agreement between the manufacturer and the licensed merchant.

The concept of parallel market (also called "grey market" and "diversion market") as briefly described above is a widespread phenomenon that costs the manufacturers of goods billions of dollars per year.

Therefore, it is very important for the manufacturer to be able to locate the source of the merchandise involved in diversion in order to stop the practice as well as to take possible legal action if the manufacturer can show that a contract has been violated.

More importantly, the manufacturer desires that the goods be sold legitimately and at a price appropriate to market conditions in the area of sale. Otherwise, other licensed merchants within the area may be undersold and driven out of business, and at the very least would become lesser customers for the manufacturer.

Further, another source of grey market goods is stolen merchandise.

Generally, an important ingredient of an anti-diversion mechanism is to mark the products with the identity of the merchant to which the manufacturer sends the goods (for simplicity, a very simple supply chain is assumed, but the present invention described below is easily adapted to more general cases by using routing information adapted to the case at hand).

Additionally, the mark must be difficult to erase. This problem is well known. Further, either the mark should also be very difficult to imitate (as the parallel marketeer could otherwise confuse the search for the source of diversion by imprinting the marks corresponding to several legitimate merchants) or additional (fake) marks should be recognizable as having been placed after the original ones.

Both problems are very easily solved for products where the routing can be decided at an early stage of the manufacturing or even the packaging process. The difficulty resides with the very numerous products where marking has to be performed during a late stage of packaging.

Materials for tagging or identifying explosives and other chemical commodities are known. Similar tagging, recognizable visually, or by some form of spectral analysis, are offered as solutions for protection against counterfeiting and parallel markets. While taggants are rather efficient when mixed with the product (as in chemicals, gasoline, explosive, and some beverages for instance), they are less efficient for articles such as luxury goods and electronics.

However, none of the known methods addresses ways in which these tagging materials or "taggants" can be utilized in conjunction with consumer merchandise for protection against parallel marketing practice. At best, they are somewhat difficult either to erase or imitate but when imitated they do not provide a means for differentiating between the original and the fake or counterfeit ones, hence which taggant was the first to be inserted or should act as the true identifier.

SUMMARY OF THE INVENTION

In view of the foregoing and other problems of the conventional methods and systems, it is an object of the present invention to provide a unique means (e.g., a coating and/or a code) for distinguishing products that are sent from a manufacturer to individual merchants. Here, a unique identifier (e.g., code) is assigned to each one of the many merchants receiving goods from the manufacturer.

With this type of coating and/or code, the manufacturer is able to trace the merchandise back to the first licensed merchant should the product appear for sale by an unauthorized merchant using spectroscopic techniques to identify uniquely placed elements within the coating.

Preferred materials for the coating include either organic resin or polymer. The organic polymer preferably includes one epoxy, organo-silanes, and cellulosics, containing at least one chemical marker. The chemical marker preferably includes at least one rare earth element.

Preferably, the coating has a thickness substantially within a range of about 0.1 micron to about 10 microns, and more preferably from about 0.1 micron to about 1 micron, and most preferably about 0.1 micron.

Such preferred materials and dimensions are equally applicable to all embodiments of the present invention described below.

In a first aspect of the invention, a method for detecting parallel marketing of an item, includes forming at least one of a coating and a code on the item, interrogating the coating and/or the code, and determining from the interrogation whether the item has been transferred from an authorized merchant to an unauthorized merchant With the unique and unobvious method and system according to the present invention, the source (e.g., an authorized, licensed first merchant) from which a second merchant has received (e.g., directly or indirectly) goods for re-sale can be easily and reliably detected. Once detected, the manufacturer can take appropriate action to stop the practice or even take legal action against the licensed first merchant for breach of contract or the like. Hence, parallel marketing of wholesale and retail items can be effectively detected and deterred.

BRIEF DESCRIPTION OF THE DRAWINGS

The foregoing and other purposes, aspects and advantages will be better understood from the following detailed description of preferred embodiments of the invention with reference to the drawings, in which:

FIG. 2 illustrates a flowchart of a process 20 for applying various coatings to an exemplary retail item (e.g., wine bottle) to permit detection of parallel marketing according to the first preferred embodiment of the present invention;

FIG. 4 illustrates a flowchart of a process 40 for scribing to detect parallel marketing according to the second preferred embodiment of the present invention.

DETAILED DESCRIPTION OF PREFERRED EMBODIMENTS OF THE PRESENT INVENTION

Figure 1:
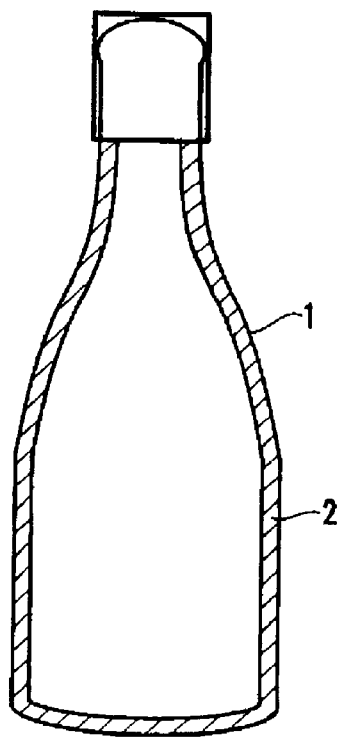
FIG. 1 illustrates a cross-sectional view of an exemplary retail item (e.g., a bottle 1 of wine) shown with a thin protective coating 2 according to a first preferred embodiment of the invention.

Referring now to the drawings, and more particularly to FIGS. 1–5, there are shown preferred embodiments of the method and system according to the present invention.
First Embodiment Turning to FIGS. 1–2, in a first preferred embodiment, a wine bottle 1 is shown as an exemplary item to which the invention can be applied.

Specifically, the merchandise (e.g., wine bottle) to be protected from parallel marketing is coated with a thin layer 2 (e.g., on the order of a thickness substantially within a range of about 0.1 micron to about 10 microns, and more preferably from about 0.1 micron to about 1 micron, and most preferably about 0.1 micron) of organic resin or polymer, such as epoxy, organo-silanes, cellulosics etc. containing relatively small traces of chemical markers (e.g., rare earth or transition metal elements), either dissolved or dispersed in the coatings. For example, the rare earth elements preferably constitute about a few parts/million of the coatings. Candidate rare earth elements include elements whose atomic numbers are approximately 57–72 (e.g., such as europium, lutetium, etc.).

The coating 2 can be applied to a portion of an item or the entire periphery of an item by dipping, spraying, evaporating, or the like. Preferably, the coating has a uniform thickness on the item, and is generally so thin that it cannot be seen in ordinary visible light. Therefore, such coatings 2 do not interfere with the external appearance of the product's packaging. Preferably, a plurality of such coatings could be produced, with at least one coating being applied to an item.

Thus, each coating 2 with its unique spectrum will serve as an identifier assigned to a particular merchant licensed by the manufacturer. The coatings are preferably strongly adherent to the object to which they are applied and are very difficult to remove completely by sandblasting, solvents, or the like.

In the case of the coatings being applied to perishable merchandise such as expensive wines or spirits, any attempt to remove the coating would likely destroy or damage the bottle. Worse yet, some coatings require high heat to accomplish removal so that any attempt at such removal would likely destroy the perishable contents of such items.

Since there are dozens of trace elements that can be used to achieve unique spectra, it is clear that thousands of unique spectra can be obtained by choosing two or more of the aforementioned rare earth elements in varying proportions.

For example, trace elements of lutetium and europium can be added to the coating material to give an x-ray spectrum uniquely different from that given by any other added trace elements. In both cases, these elements would be added in very small proportions (e.g., on the order of parts-per-million (PPM)). Thus, the manufacturer has the ability to create a one-to-one correspondence between the spectra of a particular object and the merchant to which these objects will be shipped for wholesale or retail sales. Alternatively, the presence or absence of any elements of the set of chemical trace elements gives rise to unique spectra. For example, the sixteen rare earth elements can give rise to over 64,000 unique combinations.

If the illegitimate or unlicenced merchant attempts to apply a second thin coating to overcoat the first, with the present invention, it is still possible to discover the identity of the first coating. Specifically, such can be accomplished in an analysis laboratory by either filing off a small portion of the second coating or by simply using a sufficiently high energy beam (e.g., electron beam) for interrogation, to penetrate the overcoating, thereby revealing the original spectrum (e.g., X-ray spectrum, ion spectra, etc.).

Preferably, the trace elements contained in the thin coating of epoxy, etc. should not be present also in the object to be coated for identification, as this would give rise to an ambiguous spectrum (e.g., an X-ray emission spectrum) or at the very least be extremely difficult to detect the coating spectrum. Thus, care should be taken to incorporate trace materials into the coating which are not found in the material of the item. Other types of spectra can also be considered such as that provided by high energy x-ray sources such as synchrotron radiation, neutron and ion sources. Other types of spectra, while not as simple to obtain can also be undertaken (e.g., Mossbauer spectra, refractive index measurement techniques, etc.).

The method of the first embodiment of the invention is shown in the flowchart of FIG. 2.

In step 21, a coating is prepared as discussed above preferably incorporating traces of rare earth elements.

In step 22, the coating is applied (e.g., dip coating, spraying, etc.) to the item of interest.

In step 23, the coating is dried, either passively or by heating.

In step 24, the coating is cured (e.g., by ultraviolet (UV) radiation, heating, etc.) to complete the coating process.

Two specific examples of trace elements contained within a coating to be applied to merchandise are described below.

EXAMPLE I (Ultraviolet Curable Coating)

A mixture of samarium (III) oxide (e.g., approximately 3.5 grams) and germanium oxide (e.g., approximately 1.04 grams) is dispersed in a 20% solution of phenoxy resin (e.g., approximately 100 grams) using ball milling.

Then, approximately 50 grams of the well dispersed mixture is added to a solution of 10 Kg of an epoxy (e.g., commercially available from Union Carbide under Model No. ERL 4221) in approximately 100 liters of an organic solvent (e.g., ketones, ethers, aromatic hydrocarbons etc.) and mixed.

Finally, approximately 200 grams of a photoacid generator, such as triphenylsulfonium hexafluoroantimonate, which has strong absorption at mid-UV range (e.g., a wavelength of about 365 nanometers) was added to the solution.

Then, the photocurable solution is applied to the surface of the object (e.g., by dip coating, spray coating, or the like) and air dried. Upon exposure of the coated object to UV radiation at about 365 nm or a broad band UV source, the epoxy coating is cured and becomes insoluble in common organic solvents.

EXAMPLE II (Heat Curable Coating)

Phosphomolybdic acid (e.g., approximately 1.0 gram) and niobium ethoxide (e.g., approximately 0.5 gram) are added to a solution of hydroxyethylcellulose (e.g., about 10.0 Kg) and an organotitanate cross-linking agent (e.g., commercially available from E.I. DuPont de Nemours Corporation under the tradename Tyzor LA®) (e.g., about 1.0 Kg) in about 200 liters of deionized water.

Then, the solution is coated on the surface of an object (e.g., by spraying or dipping) to a dry thickness of approximately 0.1–5 micrometer. The coating can be rendered water insoluble by brief (e.g., within a range of about 10 to about 120 seconds) heating the object at a moderate temperature (e.g., within a range of about 75° C. to about 160° C.).

Thus, with the first preferred embodiment according to the present invention, the source (e.g., a first merchant) from which an unauthorized second merchant has received goods for re-sale can be easily and reliably detected, and upon detection, the manufacturer can take appropriate action to deter or eliminate the parallel marketing.

Second Embodiment

Figure 3:
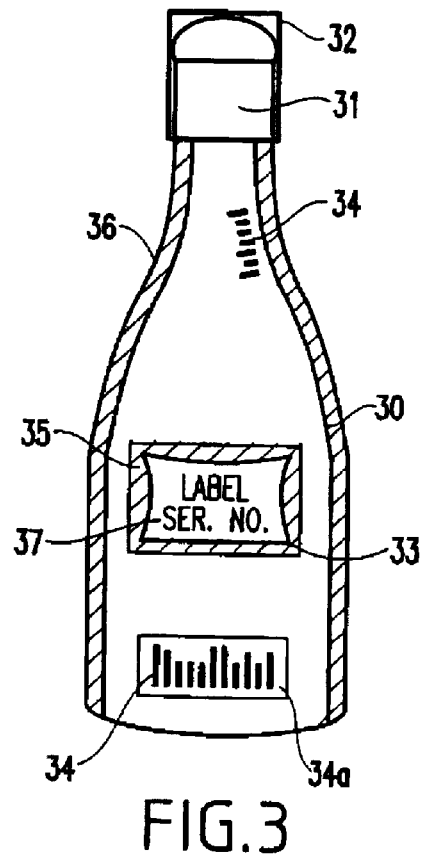
FIG. 3 illustrates a cross-sectional view of a wine bottle 30 with a miniature etched bar code 34 according to a second preferred embodiment of the present invention.

Turning to FIGS. 3–4, a second embodiment of the method according to the present invention is shown and described below. Once again, a wine bottle 30 will be provided as an exemplary, non-limiting implementation of the wholesale/retail item. Typically, the wine bottle 30 will have a cork 31, a sealing cover 32 typically made of foil or the like, and a vintner's label 33.

In the second embodiment, a special code mechanism is employed such as a 1- or 2-dimensional bar code 34. In the example below, the exemplary use of the bar code 34 will be shown.

Preferably, the bar code 34 is encrypted and subsequently scribed onto the product (e.g., wine bottle 30 in the exemplary embodiment) in a plurality of locations. Scribing includes any one or more of laser etching, chemical etching, and mechanical etching of the bar code onto the product. For example, laser scribing the bar code is particularly advantageous for printing the code inexpensively and rapidly. Moreover, laser scribing makes removal of the code difficult. The deeper the scribing (e.g., the more laser power per unit area (intensity) is used), the more difficult removal becomes.

For example, bar code BC412®, a code disclosed in U.S. Pat. No. 5,552,591, assigned to the present assignee and incorporated herein by reference, can be made as small as about 0.45 mm in height, and preferably can be laser etched at various locations on one or more surfaces of the object without being obtrusive or spoiling the outer aesthetic appearance of the package. Two-dimensional codes such as PDF417® assigned to Symbol Technologies, Inc. can also be utilized.

Preferably, the code is configured to contain information regarding its location on the object 30 and the number of codes that have been etched. This makes it extremely difficult for a re-seller to erase since both location and the number of codes are unknown and can be changed frequently and at the discretion of the manufacturer.

For example, attempts to use an etchant or to sandblast a wine bottle 30 in order to erase the laser-scribed code would be costly, inefficient and likely to affect the overall appearance of the item (e.g., bottle).

Furthermore, attempted erasure of the code 34 can be made even more difficult by hiding one or more of the laser-scribed codes 34 under the vintner's label 33 or on the very top of the bottle's neck which is covered by the sealing cap 32 applied by the manufacturer.

To remove the identifier under the label, the merchant would likely have to reprint labels 34. To remove the identifier under the sealing cap 32 would be a very difficult task and probably too expensive and risky to undertake. In that regard also, in the earlier example of using spectroscopically analyzable materials it would be almost impossible to attempt to remove that portion of the film containing trace elements that is covered by a bottle sealing cap 32 or a label 33.

For added protection, the label 34 can be overcoated with a protective layer 35 to make removal of the label essentially impossible (or at least impractical), thereby further protecting any scribed code 34 that might appear under the label 33. Attempts to remove this coating 35 would likely damage or destroy the item (bottle).

Further, a coating 36, preferably formed of polyethylene and having a thickness within a range of about 0.1 to about 0.2 $\mu$m, may be provided that has substantially the same index of refraction as the item (e.g., glass) so that none of the laser scribed bar codes can be seen under ordinary conditions with the observer's naked eye (e.g., without the aid of special diagnostic instruments, etc.) This coating could cover some or all of the item.

However, if there is a suspicion of parallel marketing, the manufacturer can remove the coating using for example high temperature solvents which then reveals the laser-scribed codes on the package. Thus, the unauthorized seller can be easily tracked.

Additionally, the label 33 may contain an encrypted, visible bar code 37 containing a serial number. The information provided by the bar code may include the position or locations where the scribed code marks can be found. The decryption may be held solely by the security agent or department of the manufacturer. The label bar code also may contain an encrypted version of an individualized serial number of the particular item which is preferably decrypted by public key.

Thus, with the inventive identifiers cited, it becomes extremely difficult, if not impossible, to remove the identifiers whose assignment and encrypted code is known only to the manufacturer. When the manufacturer suspects that parallel marketing is occurring, the manufacturer can readily identify the unauthorized re-seller and can take appropriate action to stop the unauthorized activity.

The process 40 of the second embodiment of the invention is shown in the flowchart of FIG. 4.

In step 41, an item (e.g., bottle) is scribed with the code (e.g., bar code) at at least one location on the item. Thereafter, the following optional steps may be performed as described above.

For example, in step 42, the scribed code may be applied with a protective coating 34a which has the same index of refraction as the item's material (e.g., glass). Along these lines if the scribed code is underneath the vintner's label, the protective coating 35 may be applied to the label.

Finally, in step 43, the steps of process 20 of the first embodiment, may be performed for even greater protection.

Specifically, in step 43, the coating is applied (e.g., dip coating, spraying, etc.) to the item of interest, after it has been scribed, etc. in step 41 (or after optional step 42 processing).

Then, the coating is dried, either passively or by heating, and the coating is cured (e.g., by ultraviolet (UV) radiation, heating, etc.) to complete the process.

Thus, the second embodiment allows a manufacturer to detect a parallel marketeer easily and reliably.

Figure 5:
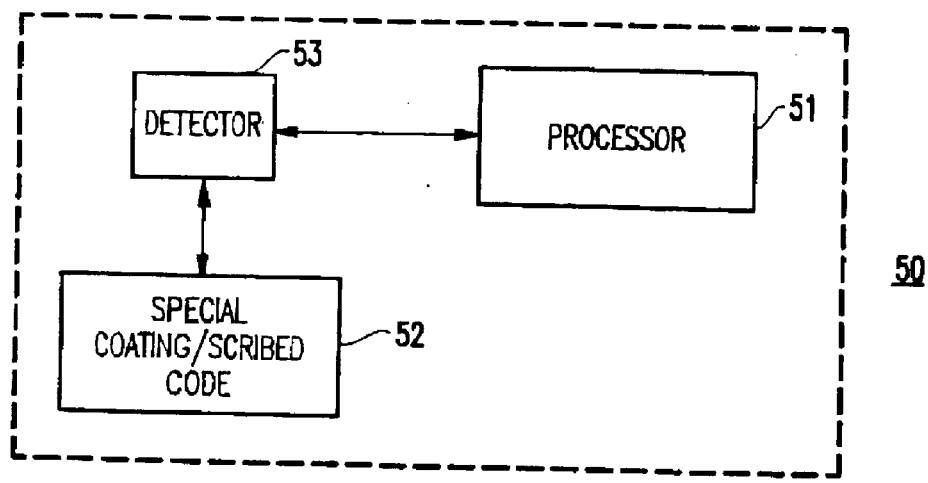
FIG. 5 illustrates a system 50 for detecting parallel marketing of wholesale and retail items for use with the first and second preferred embodiments of the present invention.

Along with the above-described method, a system 50 for use with the method of the present invention is provided for detecting parallel marketing will be generally described referring to the block diagram of FIG. 5.

As shown, the system 50 includes a processor 51, a special coating/scribed code 52 (as described above in the first and second embodiments) for application to the item of interest, and a detector 53 for determining the information contents of the special coating/scribed code. While the detector 53 is shown separately from the processor 51, the detector could include the processor built therein.

While the above examples have focused on parallel marketing as it relates to wine and spirits, it is clear that the inventive techniques described can be used equally well to protect a wide variety of a much larger class of items.

While the invention has been described in terms of several preferred embodiments, those skilled in the art will recognize that the invention can be practiced with modification within the spirit and scope of the appended claims.

What is claimed is:

1. A system for detecting unauthorized marketing of an item comprising:

a coating formed on said item, wherein said coating contains at least one chemical marker, wherein a presence of said at least one chemical marker forms a code, wherein said presence is not substantially observable under ordinary visible light, and wherein said presence is detectable by a unique spectrum;

a detector for determining information contents of said coating and said code; and a processor for determining, based on an output of said detector, whether said item has been transferred from an authorized merchant to an unauthorized merchant, wherein said at least one chemical marker comprises at least one rare earth element, wherein an index of refraction of said coating and said item are substantially the same, and wherein said code is derived from a unique spectrum based upon a proportion of at least two chemical markers and a presence or absence of one or more chemical markers.

2. The system of claim 1, wherein said spectrum results from one of an x-ray source, an electron beam, an ion source, and a neutron source.

3. The system of claim 1, wherein said processor traces back said code on said item to an authorized merchant.

4. The system of claim 1, wherein said at least one chemical marker comprises at least one of a dissolved marker and a dispersed marker in said coating.

5. The system of 1, wherein said code is assigned to a merchant.

6. The system according to claim 1, wherein said at least one rare earth element comprises at least one element from a group of elements whose atomic numbers are approximately 57 to 72.

7. The system according to claim 1, wherein said detector comprises a spectrometer.

8. The system of claim 1, wherein said at least one chemical marker comprises two or more rare earth elements not present in said item.

9. The system of claim 1, wherein said at least one rare earth element comprises lutetium and europium.

10. The system of claim 1, wherein a thickness of said coating is within a range of 0.1 to 10 microns.

11. The system of claim 1, wherein said coating comprises multiple coatings, each of said multiple coatings comprising a unique spectrum.

12. The system of claim 1, wherein said coating comprises at least one of epoxy, organo-silanes, and cellulosics.

13. The system of claim 1, further comprising:

a protective coat for covering said coating, said protective coat comprising an index of refraction substantially the same as that of the coating and the item.

* * * * *